(12) United States Patent
Eddins

(10) Patent No.: US 10,813,297 B2
(45) Date of Patent: Oct. 27, 2020

(54) POTTED PLANT SUPPORT APPARATUS

(71) Applicant: Christopher Eddins, Colorado Springs, CO (US)

(72) Inventor: Christopher Eddins, Colorado Springs, CO (US)

( * ) Notice: Subject to any disclaimer, the term of this patent is extended or adjusted under 35 U.S.C. 154(b) by 355 days.

(21) Appl. No.: 15/891,127

(22) Filed: Feb. 7, 2018

(65) Prior Publication Data

US 2019/0239449 A1    Aug. 8, 2019

(51) Int. Cl.
*A01G 9/12*    (2006.01)

(52) U.S. Cl.
CPC .................... *A01G 9/124* (2013.01)

(58) Field of Classification Search
CPC .................... A01G 9/12; A01G 9/124
USPC .............................................. 47/47
See application file for complete search history.

(56) References Cited

U.S. PATENT DOCUMENTS

| | | | |
|---|---|---|---|
| 4,270,310 A | 6/1981 | Fischer | |
| 4,475,306 A * | 10/1984 | Mehrens | ................ A47H 27/00 248/236 |
| 4,841,670 A | 6/1989 | Bitter | |
| 5,537,768 A | 7/1996 | Tesselaar et al. | |
| 5,778,597 A | 7/1998 | Klevstad | |
| 6,067,751 A | 5/2000 | Payr | |
| 6,408,569 B1 * | 6/2002 | Obregon | ................ A01G 9/124 47/42 |
| 6,588,147 B2 | 7/2003 | Bayly et al. | |
| 7,905,053 B2 | 3/2011 | Lisciotti et al. | |
| 7,966,768 B2 | 6/2011 | DiPaolo et al. | |
| 2009/0133326 A1 * | 5/2009 | Donaldson | ............... A01G 9/02 47/47 |
| 2012/0066969 A1 | 3/2012 | van der Starre | |
| 2014/0196365 A1 * | 7/2014 | Washington | ........... A01G 9/124 47/66.6 |
| 2017/0127621 A1 * | 5/2017 | Harger | .................... A01G 9/124 |
| 2017/0181385 A1 * | 6/2017 | Daniel | ..................... A01G 9/12 |

\* cited by examiner

*Primary Examiner* — Claude J Brown
(74) *Attorney, Agent, or Firm* — Brenda L. Speer, LLC; Brenda L. Speer

(57) ABSTRACT

The present invention is for a potted plant support apparatus for use with a container, plant stake and net, cage or trellis support. The apparatus is adjustable to fit a height of a container and is mounted on an exterior of the container, wherein the apparatus holds a stake exterior to the container, and further wherein an optional clip may be affixed removably to the stake and an optional trellis may be affixed removably to the clip and configured to surround an area above and exterior to the container and to enclose and support a potted plant within the trellis. The apparatus comprises an upper stand and a lower stand which removably engage with each other by interlocking teeth, and may further comprise an optional lock to secure the upper stand and the lower stand to each other when removably engaged.

25 Claims, 20 Drawing Sheets

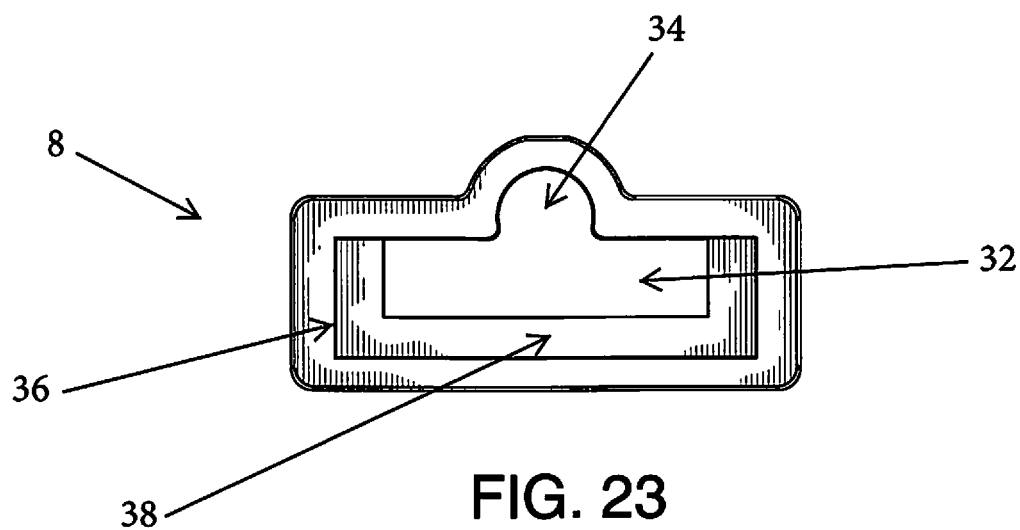
FIG. 23
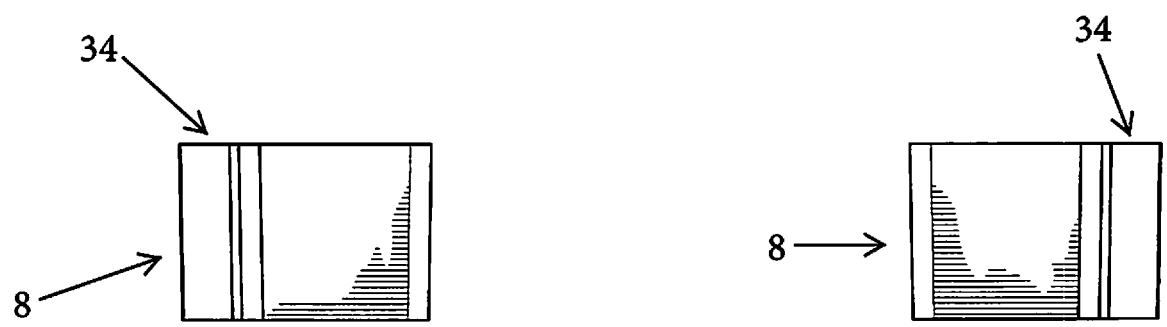
FIG.24
FIG.25

POTTED PLANT SUPPORT APPARATUS

BACKGROUND OF THE INVENTION

Field of the Invention

The field of the present invention generally relates to a support apparatus for a potted plant which apparatus supports the plant as it grows within a container or pot.

Description of Related Art Including Information Disclosed Under 37 CFR 1.97 and 37 CFR 1.98

Various apparatuses are known in the prior art which comprise a container for a plant and a gardening plant stake and net or cage to support the plant as it grows within the container.

U.S. Pat. No. 4,270,310 issued Jun. 2, 1981, by Fischer for "Support Device for an Upstanding Plant Support Rod in a Plant Pot" discloses a support body portion extends inwardly from the top rim of a plant pot and has a substantially vertical channel therethrough bounded on the outer end by the inner surface of the pot, on the inner end by a rod support groove substantially parallel with the axis of symmetry of the pot and on the sides by a pair of side walls that converge radially inward. A plant support rod is positioned in the rod support groove and extends above the pot a substantial distance so that a plant in the pot can be tied to it for support. A spring wedge having a pair of legs, at the same angle to each other as the angle of the slope of the pot side to the axis of symmetry, joined by a resilient bight portion is pushed down into the top of the vertical channel so one leg bears against the sloping wall of the pot and the other leg bears against the support rod to anchor it firmly in the vertical rod support groove. In one form, the support body portion is formed integrally with the pot and in a modified form it is a separated unit attached to the rim of a pot by hook shaped members.

U.S. Pat. No. 4,841,670 issued Jun. 27, 1989, by Bitter for "Apparatus for Supporting Plants" discloses an apparatus for supporting growing plants such as tomato plants, including radially arranged poles projecting from an annular base mounted on the top of a soil containing pot. The stems or branches of the plant are guided upwardly and within the space defined by the poles by means of strings tying the stems or branches securely around the poles.

U.S. Pat. No. 5,537,768 issued Jul. 23, 1996, by Tesselaar et al. for "Display Stakes for Potted Plants" discloses a label display stake for use with plant containers and which is formed as a single piece, preferably from a plastics material. The stake has an elongate body having an upper label carrying portion, and a lower mounting portion which is located within a plant container when the stake is in use. Label attaching structure is provided on the upper portion and is operative to resist separation of the label from the stake. In one form, the label attaching structure holds the label at a particular disposition for convenient viewing and also holds the label against rotation about the axis of the stake. Mounting structure is provided on the stake for cooperation with a plant container so as to hold the stake against a side of the container and also resist removal of the stake from the container. Stabilizing structure may be provided on the stake so as to hold it against lateral tilting relative to the container.

U.S. Pat. No. 5,778,597 issued Jul. 14, 1998, by Klevstad for "Support Device for Potted Plants and the Like" discloses a device for supporting potted plants and the like, comprising a saucer and at least one support pin which can be fitted to the rim of the saucer so as to support at its upper part a plant stem or stalk which stretches upwards from a plant pot resting on the saucer.

U.S. Pat. No. 6,067,751 issued May 30, 2000, by Payr for "Plant Container with a Plant Stake Fixing Device" discloses a plant container which includes a plant-stake fixing device, wherein the plant container in the region of its rim is provided with at least two coupling components rigidly connected with the side-wall of the plant container. The plant-stake fixing device is provided at least on one end with a mating coupling component and, at a distance from the mating coupling component, with at least one retaining component serving as a holder for a plant stake. The plant-stake fixing device is provided with two mating coupling components arranged at a predetermined distance and in the region of the rim of the plant container there are provided at least two coupling components arranged in correspondence with the mating coupling components and at a distance from each other.

U.S. Pat. No. 6,588,147 issued Jul. 8, 2003, by Bayly et al. for "Juvenile Plant Holding Device" discloses a stake for use with plants including: a foundation means for stabilizing the stake being locatable in a relatively fixed position near the plant; a foundation stem extending from the foundation means, at least a portion of the foundation stem being hollow; a holding means for holding the plant or a display object, the holding means being associated with the foundation stem and remote from the foundation means.

U.S. Pat. No. 7,905,053 issued Mar. 15, 2011, by Lisciotti et al. for "Poles for Supporting Growing Plants" discloses a telescoping pole for supporting growing plants comprises two or more elongate pole members, one of which has a pointed stake section at one end to facilitate insertion into the ground. The pole includes means for locking the elongate pole members in a number of different telescoped positions, whereby to allow for adjustment of the effective length of the pole according to the height of the plant that it supports. The telescoping members are made of a polymer material, with at least one of the telescoping members comprising two injection-molded component parts that are mechanically attached to one another.

U.S. Pat. No. 7,966,768 issued Jun. 28, 2011, by DiPaolo et al. for "Staking System for Growing Container" discloses a staking system for use with a self-watering growing container includes an outrigger structure at each longitudinal end. Each outrigger structure is mountable on the bottom of the growing container to provide stability. Two vertical stakes are attached to respective outrigger structures. Connectors at the top of each stake thus mount a horizontal stake element between the two connectors. A rim clamp secures the vertical stakes, clamping them on the lip of the plant growing container.

US Patent Publication 2012/0066969 published Mar. 22, 2012, by van der Starre for "Stake for a Pot and Assembly" discloses an improved stake for a pot, in particular a plant pot with a side wall which is provided at an upper side with a rim portion protruding from the side wall is provided herewith. The stake is provided with a connector for at least partially gripping around the rim portion. The connector comprises a first leg and a second leg which in use are connected for forming the connector with a U- or C-shape with an aperture for gripping the rim portion. The stake is provided with a latching arrangement for, in connected state of the first and second legs, snapping the first and second legs opposite each other into one or more relative positions.

These apparatuses have various disadvantages. For instance, some are installed within the container and such apparatuses interfere with the growth of the plant and can cause damage to the plant, particularly in regard to the plant's root system. Some of these apparatuses are installed upon or around the container; however, they can be cumbersome, they are not readily assembled or disassembled for use or storage, or do not allow containers with the apparatus to be stacked or nested within each other when not in use for efficient storage, or they consume additional and unnecessary peripheral space around the container which is not conducive to efficient and cost-effective plant raising, such as in commercial nurseries where the number of containers within a floor space needs to be maximized.

BRIEF SUMMARY OF THE INVENTION

A potted plant support apparatus of the present invention comprises: (1) an upper stand with a neck having interlocking neck teeth and an upper stake recess along a length of the neck; a cap integral with the neck and the cap having a stake upper through-hole; a lip integral with the cap; and a neck angle of the neck to the cap is about 90°; (2) a lower stand with a collar having interlocking collar teeth; a foot integral with the collar and the foot having a stake lower through-hole; and a collar angle of the collar to the foot is about 94°; (3) an optional lock to secure the engaged upper stand and lower stand to each other and having a neck opening able to receive removably the neck of the upper stand; a collar opening able to engage removably the collar of the lower stand; a stake lock through-hole to accommodate a stake; and a collar rim that abuts a top of the collar and retains the lock in place upon the apparatus when the upper stand and lower stand are engaged removably with each other; and (4) an optional clip able to be attached removably to a stake and the clip having at least an upper notch and at least a lower notch able to engage removably with a trellis; and a clip stake receiver recess able to engage removably with a stake. Further wherein, the upper stand and the lower stand removably engage with each other by means of the interlocking teeth; the engaged apparatus can accommodate a stake; and the engaged apparatus is mounted on an exterior of a container.

Optionally, the engaged apparatus of the present invention further is able to accommodate an optional stake. Further, the apparatus of the presention is able to accommodate an optional trellis able to be attached removably to the clip. Further optionally, the apparatus of the present invention may further comprise an adjustable strap to secure the apparatus upon the container, wherein the strap is able to be wrapped around and cinched snug about an outer perimeter of both the apparatus and the container.

BRIEF DESCRIPTION OF THE SEVERAL VIEWS OF THE DRAWING(S)

FIG. 23 is a plan view of bottom side of the lock of the apparatus of the present invention.

FIG. 24 is a plan view of a right side of the lock of the apparatus of the present invention.

FIG. 25 is a plan view of a left side of the lock of the apparatus of the present invention.

Figure 1:
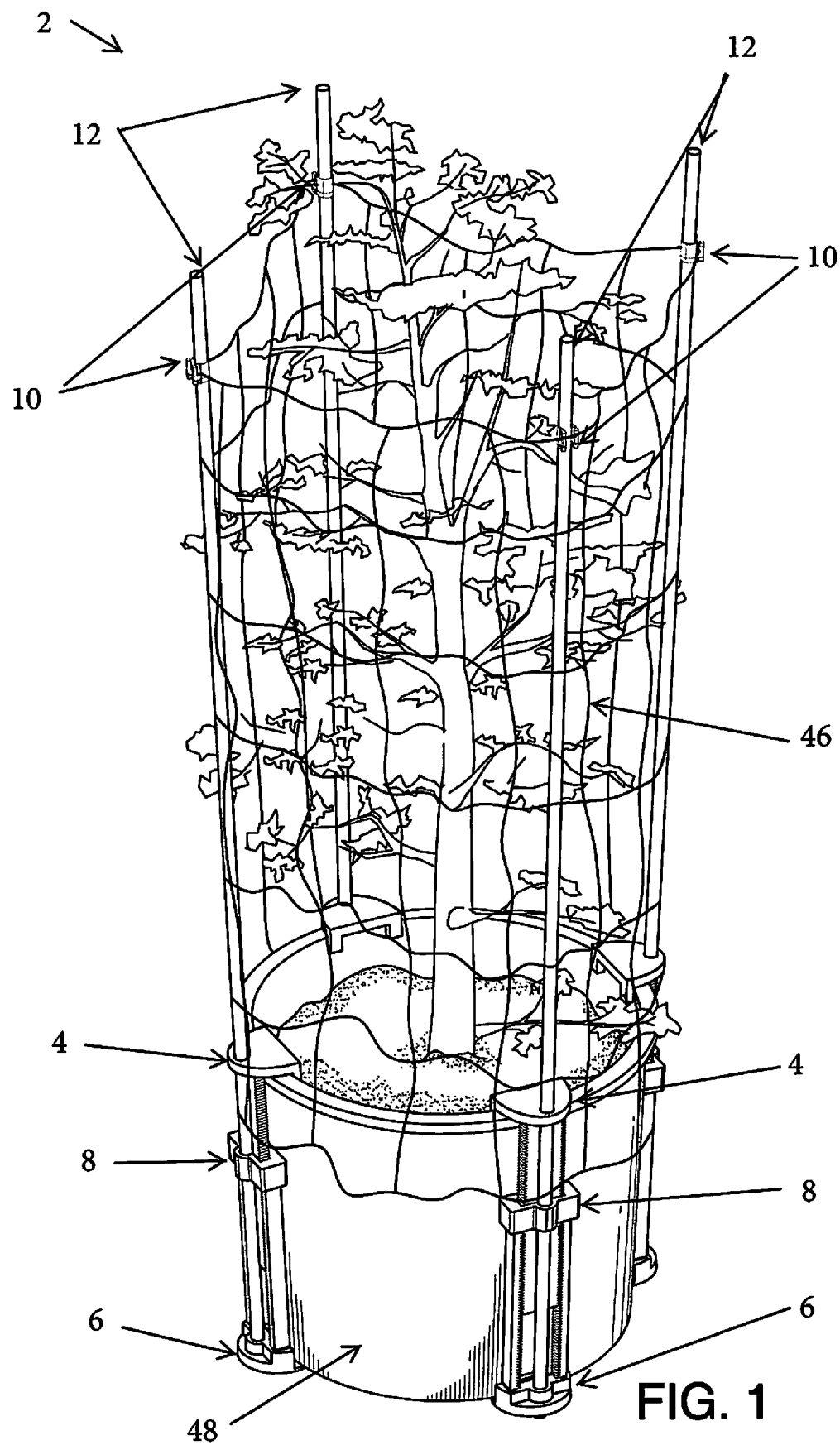
FIG. 1 is perspective view of the potted plant support apparatus of the present invention shown in use with a container or pot, a potted plant, stakes and a trellis.

LIST OF REFERENCE NUMERALS 2 apparatus
4 upper stand
6 lower stand
8 lock
10 clip 12 stake
14 cap
16 lip
18 stake upper through-hole
20 neck
22 neck teeth
24 foot
26 stake lower through-hole
28 collar
30 collar teeth
32 neck opening
34 lock stake through-hole
36 collar opening
38 collar rim
40 upper notch
42 lower notch
44 clip stake receiver recess
46 net or cage or trellis
48 pot or container
50 stake upper recess
52 neck angle
54 collar angle

DETAILED DESCRIPTION OF THE INVENTION

There is a need for a potted plant support apparatus which avoids the disadvantages of the prior art apparatuses discussed above. The potted plant support apparatus of the present invention achieves the same. Of particular import is that the apparatus of the present invention is installed upon an exterior of a pot which does not interfere with the growth of a plant in the pot and does not cause damage to either the plant's root system within the pot, because there is no portion of the apparatus within the pot, or to the plant's trunk, limbs or leaves above the pot, because the apparatus does not restrict the plant's growth. The apparatus of the present invention is compact, is not cumbersome, is readily assembled or disassembled for use or storage, and allows containers with a stand (by itself and without stakes or a trellis) of the apparatus of the present invention installed upon them to be stacked or nested within each other when not in use for efficient storage. Additionally, the apparatus of the present invention does not consume additional and unnecessary peripheral space around the container which is conducive to efficient and cost-effective plant raising, such as in commercial nurseries where the number of containers within a floor space needs to be maximized.

The present invention is for a container gardening or potted plant support apparatus for use with a plant stake and net, cage or trellis support. The support apparatus of the present invention is adjustable to fit a height of and is mounted on an exterior of a container or pot, further wherein the support apparatus holds an optional stake exterior to the container, and further wherein an optional attachment means may be removably affixed to the stake and by which attachment means a net, cage or trellis can be removably affixed to the stake and configured to surround the area above and exterior to the container and to enclose and support a potted plant within the net, cage or trellis. The support apparatus comprises an upper stand and a lower stand which removably engage with each other by means of interlocking teeth. The support apparatus may further comprise an optional lock to secure the upper stand and the lower stand to each other when engaged.

As shown in FIG. 1-4, a potted plant support apparatus 2 of the present invention comprises an upper stand 4, a lower stand 6 and an optional lock 8. When the upper stand and the lower stand are engaged with each other, they can accommodate an optional stake 12. A trellis attachment means, or an optional clip 10, can be removably attached to an optional stake 12 and an optional trellis 46 can be removably attached to the clip 10 to support a plant growing within a container or pot 48.

Figure 7:
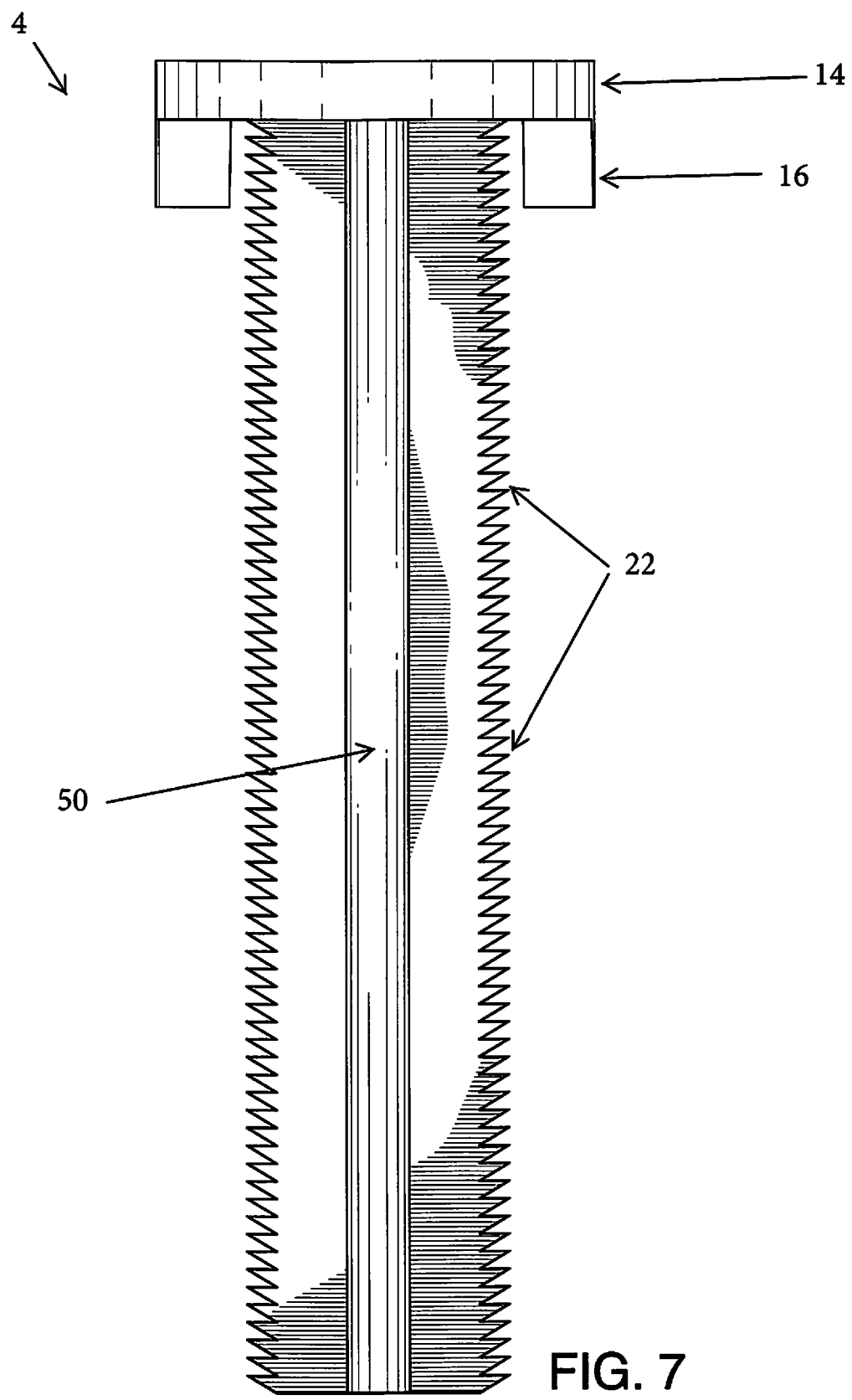
FIG. 7 is a plan view of an outside of the upper portion of the pot stand of the apparatus of the present invention.
Figure 8:
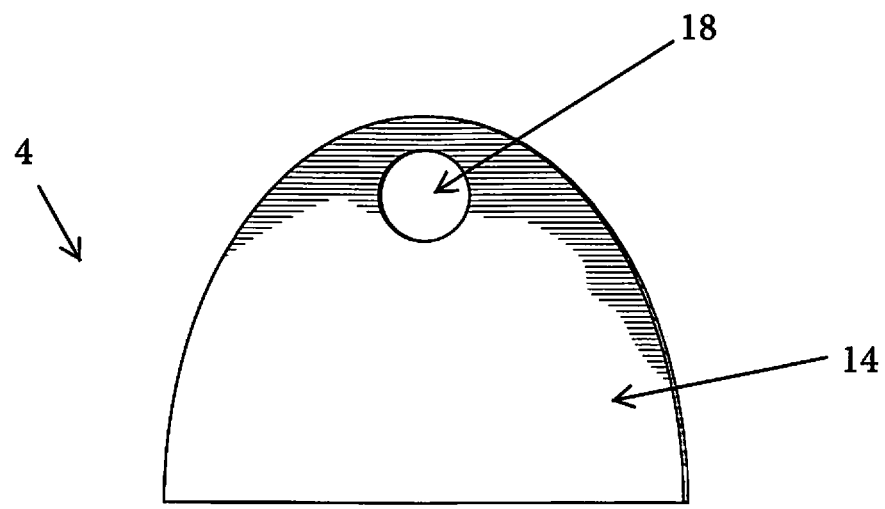
FIG. 8 is a plan view of a top side of the upper portion of the pot stand of the apparatus of the present invention.
Figure 9:
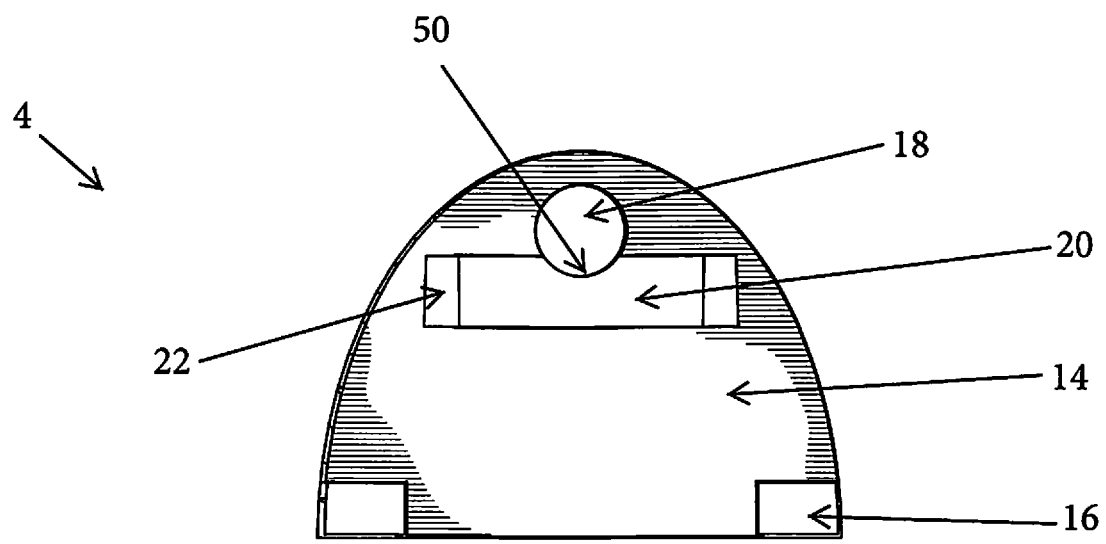
FIG. 9 is a plan view of a bottom side of the upper portion of the pot stand of the apparatus of the present invention.
Figure 10:
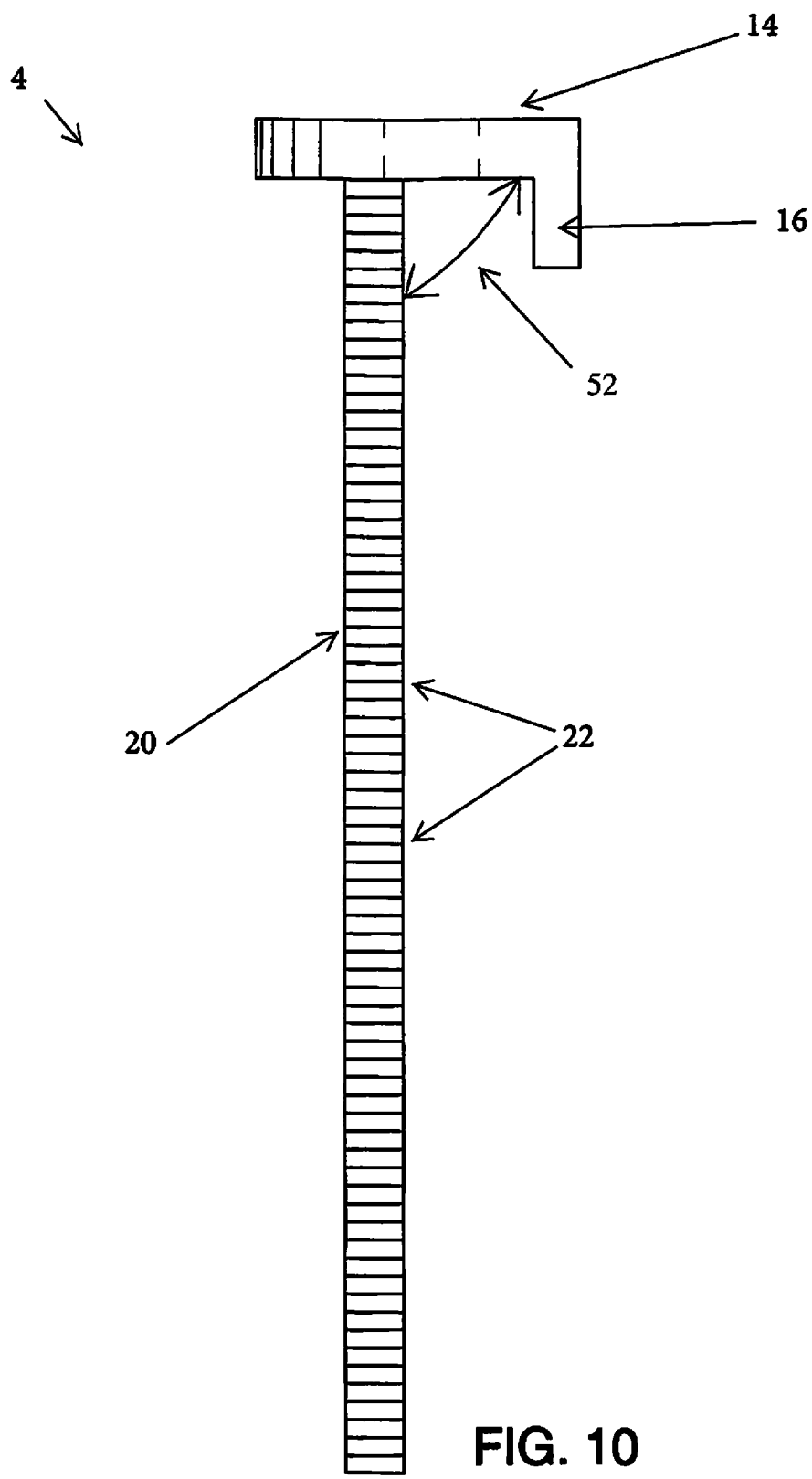
FIG. 10 is a plan view of a right side of the upper portion of the pot stand of the apparatus of the present invention.
Figure 11:
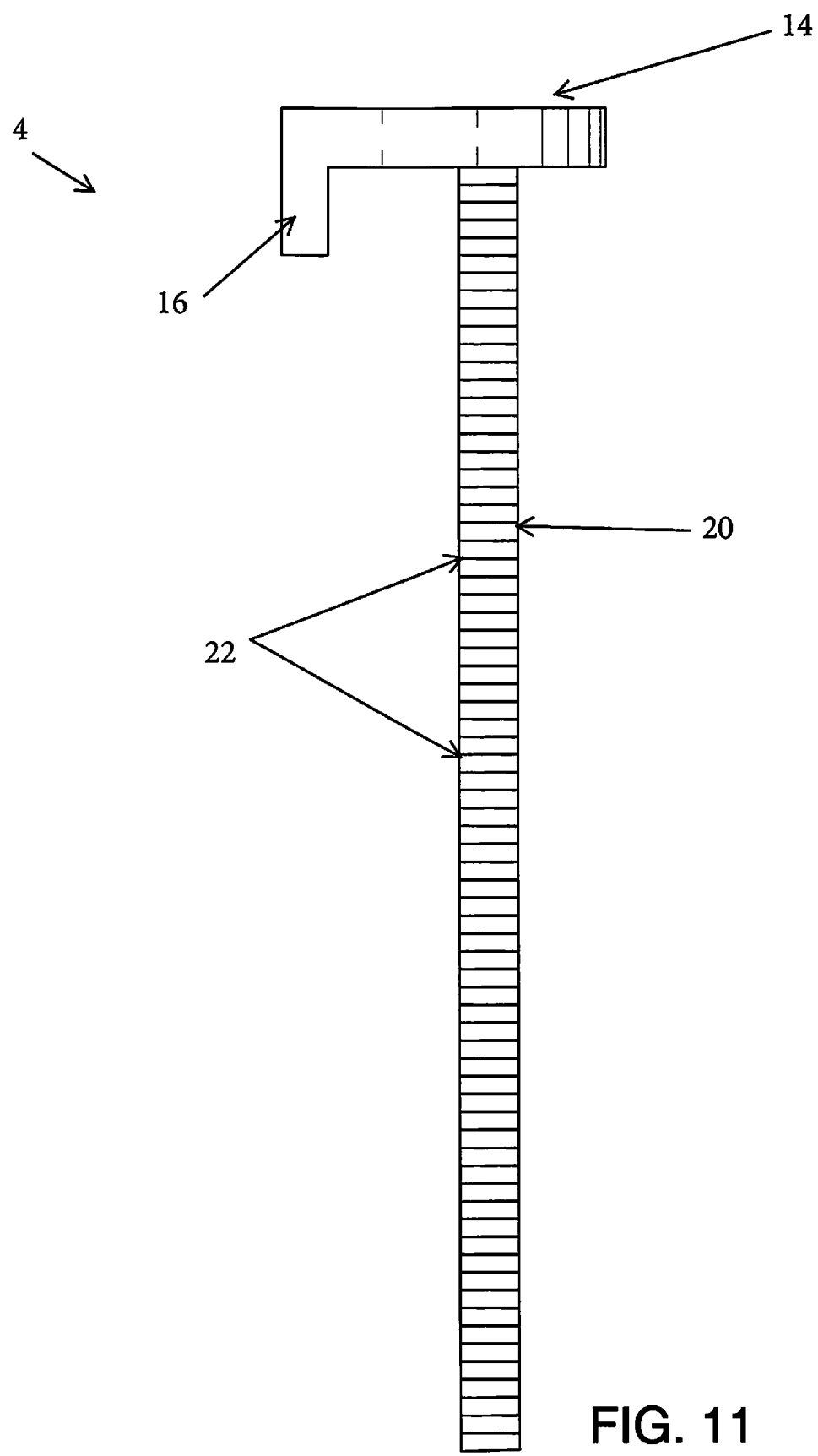
FIG. 11 is a plan view of a left side of the upper portion of the pot stand of the apparatus of the present invention.
Figure 12:
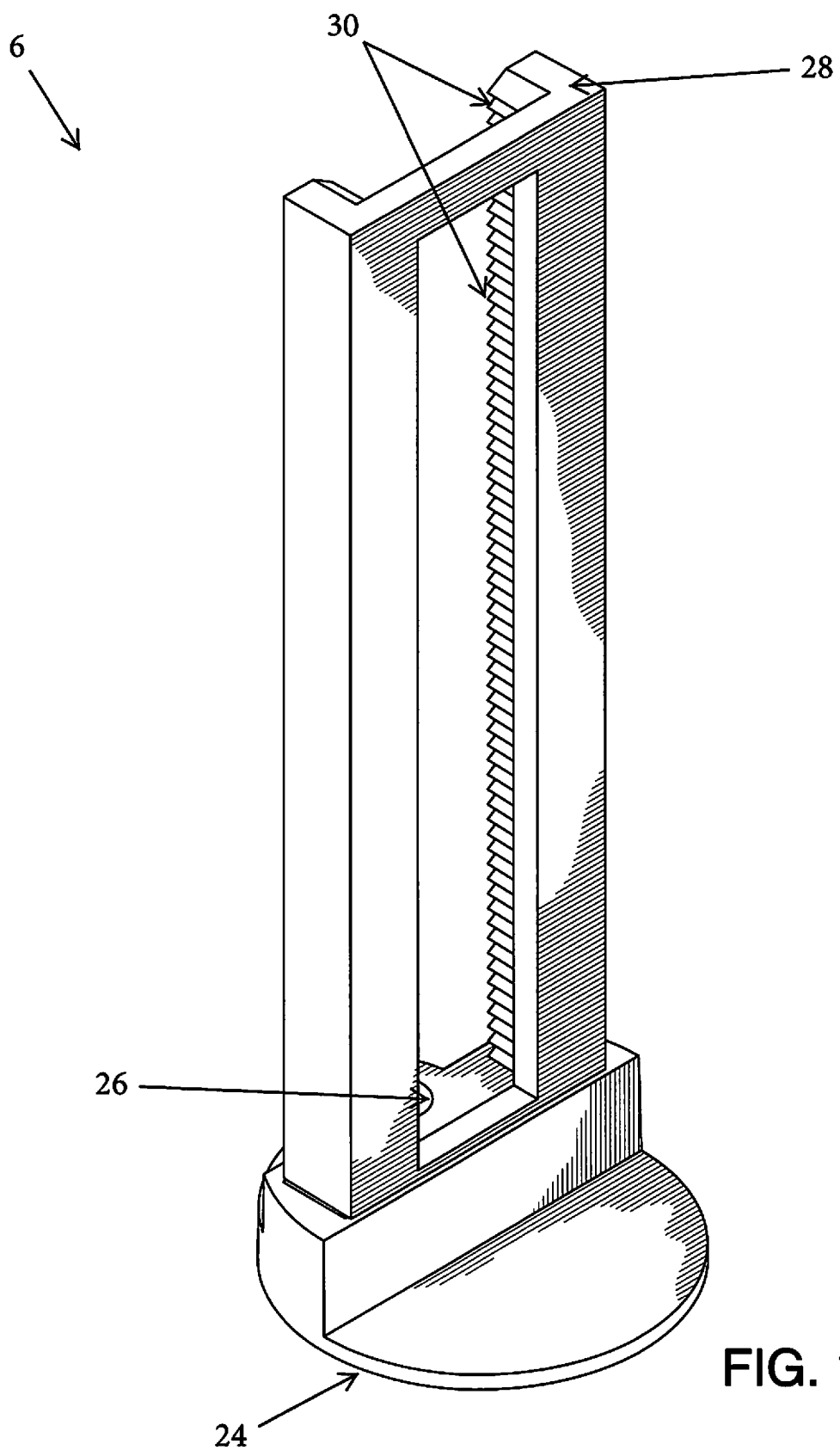
FIG. 12 is a perspective view of an inside of a lower portion of the pot stand of the apparatus of the present invention.
Figure 13:
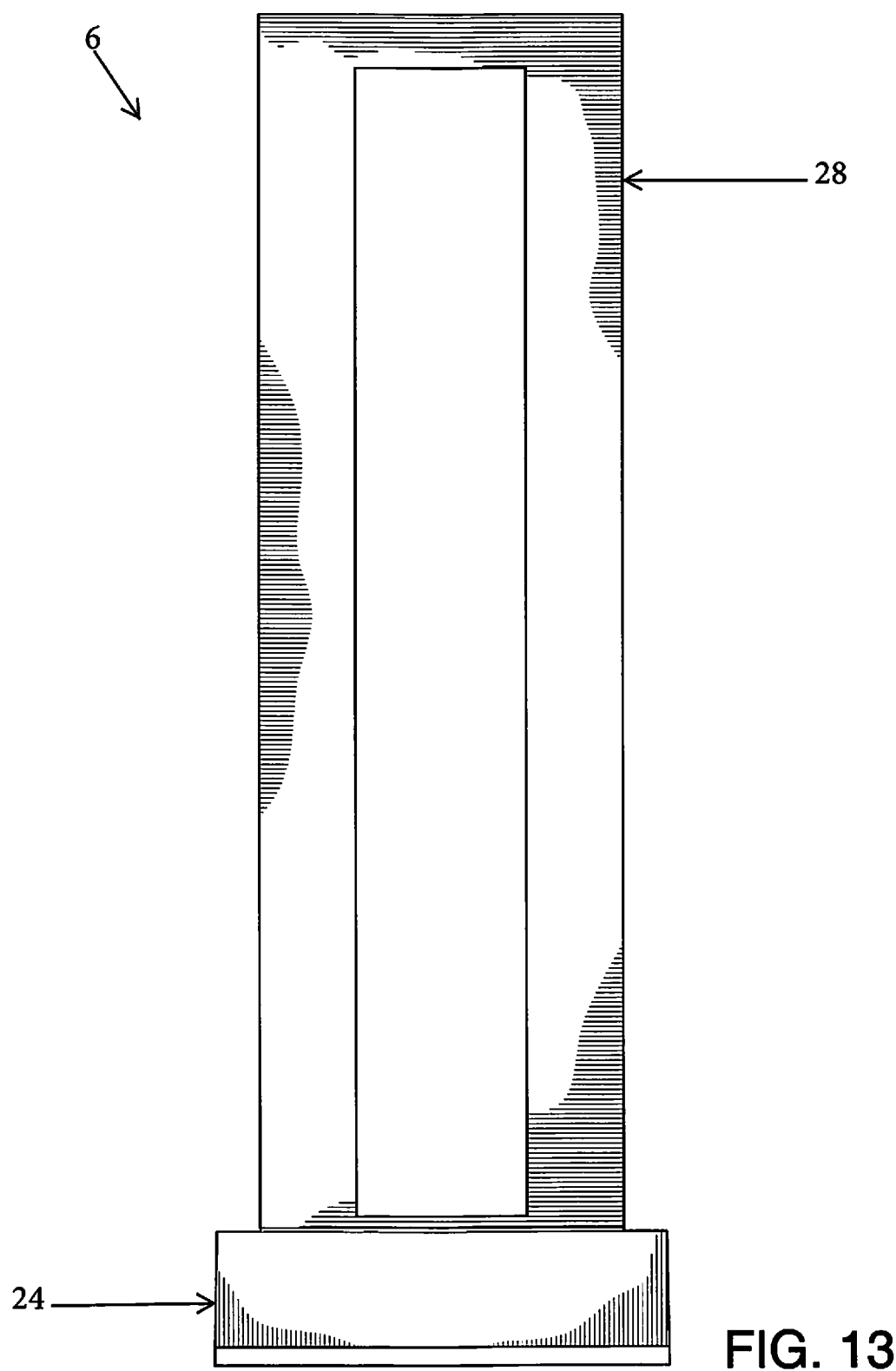
FIG. 13 is a plan view of an inside of the lower portion of the pot stand of the apparatus of the present invention.
Figure 14:
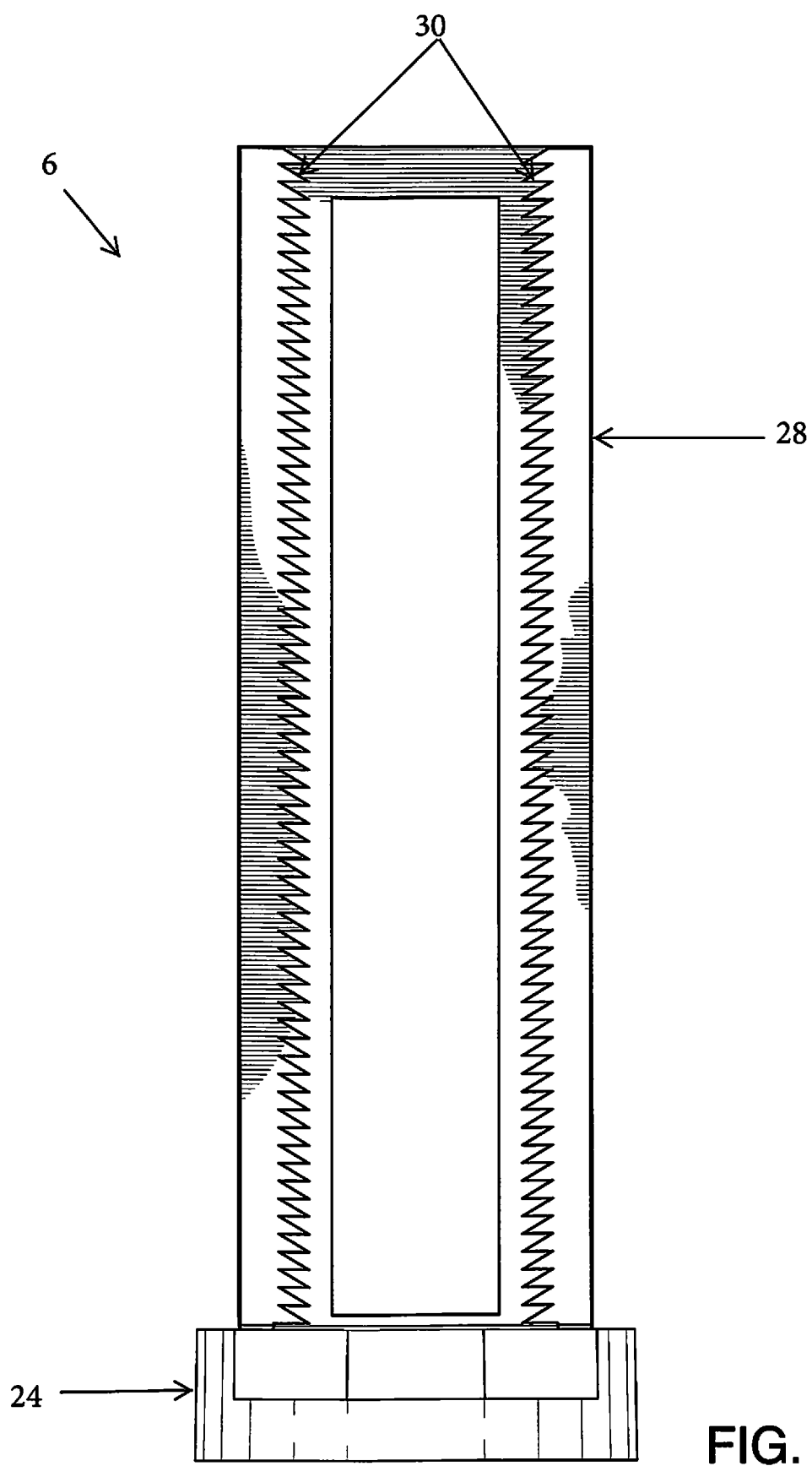
FIG. 14 is a plan view of an outside of the lower portion of the pot stand of the apparatus of the present invention.
Figure 15:
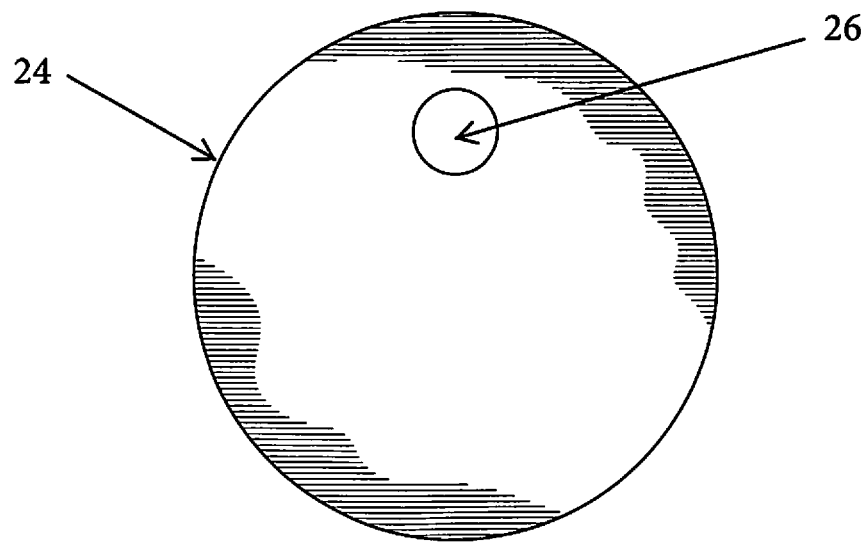
FIG. 15 is a plan view of a bottom side of the lower portion of the pot stand of the apparatus of the present invention.
Figure 16:
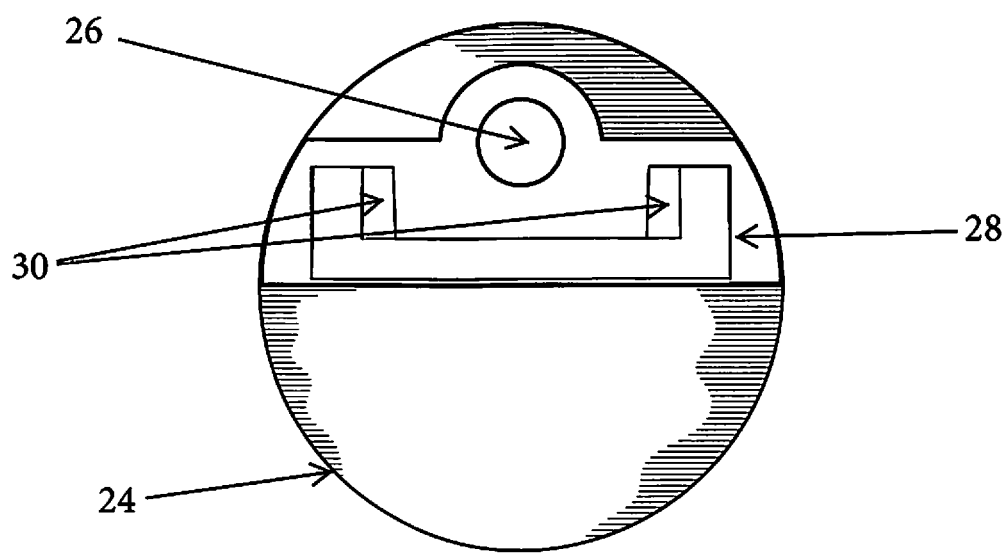
FIG. 16 is a plan view of a top side of the lower portion of the pot stand of the apparatus of the present invention.

As shown in FIG. 2-11 the upper stand 4 comprises a neck 20 having interlocking neck teeth 22, a cap 14 integral with the neck 20 and having a stake upper through-hole 18, and a lip 16 integral with the cap 14. When the apparatus 2 is removably engaged upon a pot 48, the cap 14 is in contact with a top edge or rim of the pot 48 and the lip 16 extends over the rim to secure the upper stand 4 upon the pot 48. As shown in FIG. 7 and FIG. 9, the neck 20 has a stake upper recess 50 along its length. With reference to FIG. 11, a neck angle 52 of the neck 20 to the cap 14 is about 90°.

Figure 17:
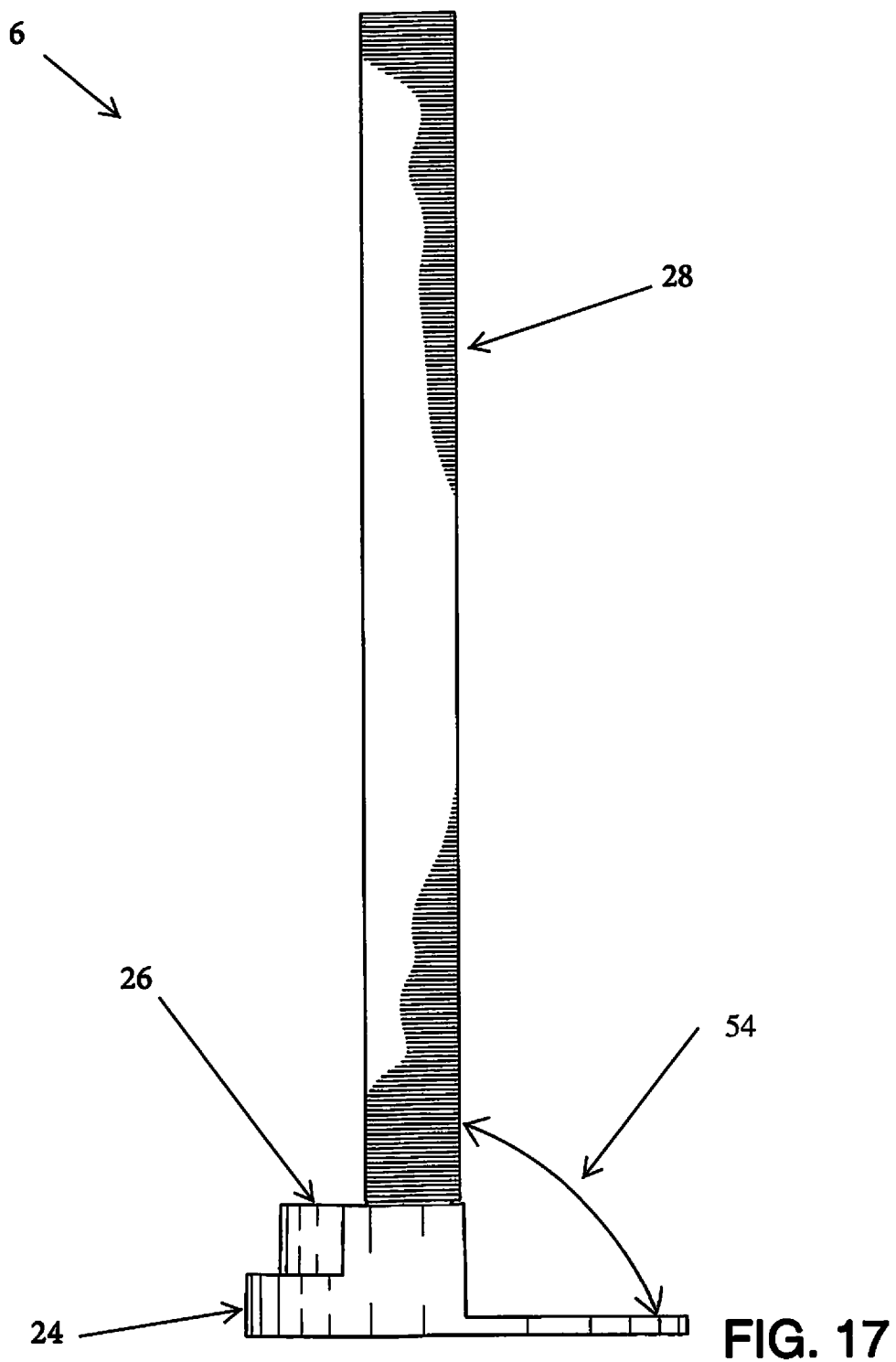
FIG. 17 is a plan view of a right side of the lower portion of the pot stand of the apparatus of the present invention.
Figure 18:
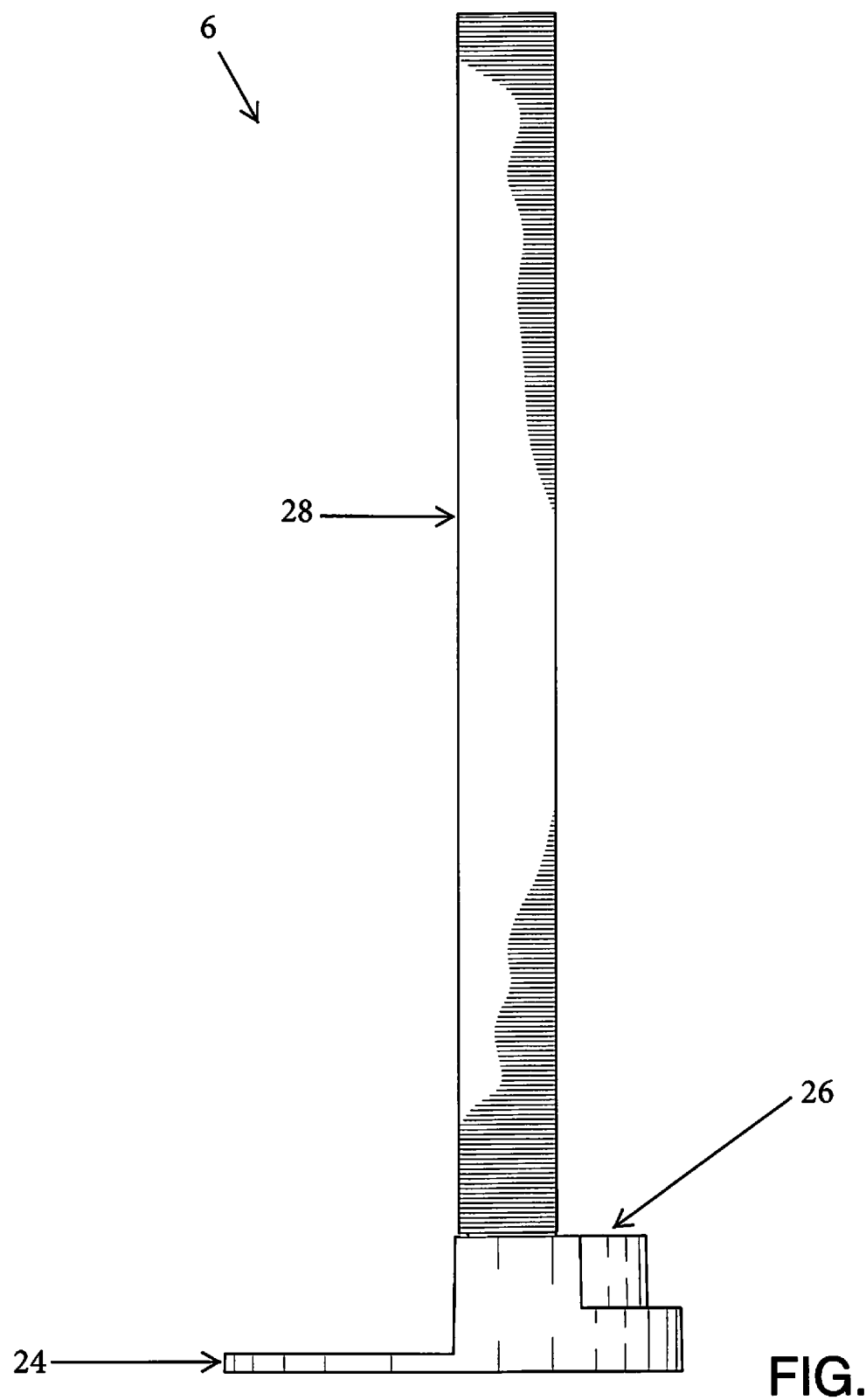
FIG. 18 is a plan view of a left side of the lower portion of the pot stand of the apparatus of the present invention.
Figure 19:
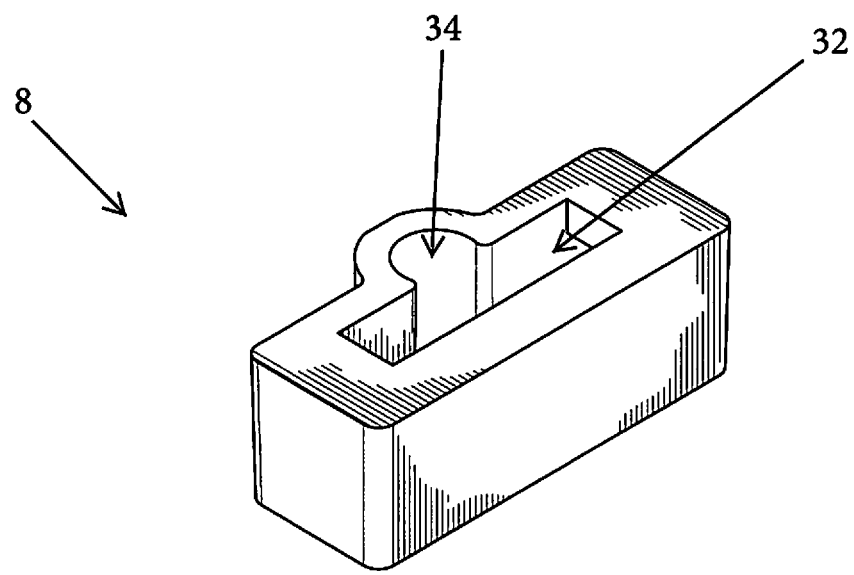
FIG. 19 is a perspective view of a lock of the apparatus of the present invention.
Figure 20:
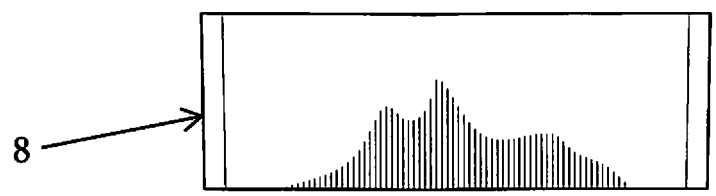
FIG. 20 is a plan view of a front, or pot-facing side, of the lock of the apparatus of the present invention.
Figure 21:
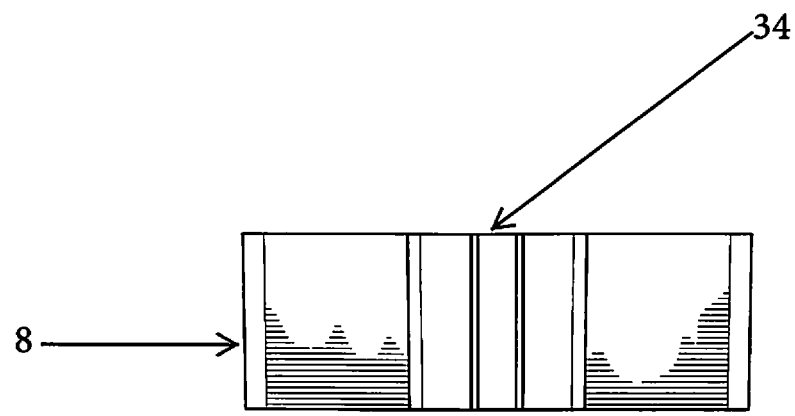
FIG. 21 is a plan view of a back or, non-pot-facing side, of the lock of the apparatus of the present invention.
Figure 22:
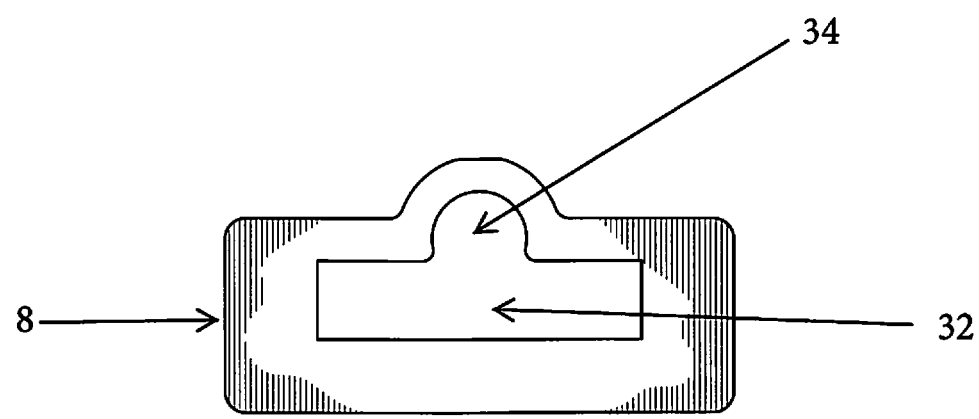
FIG. 22 is a plan view of a top side of the lock of the apparatus of the present invention.
Figure 26:
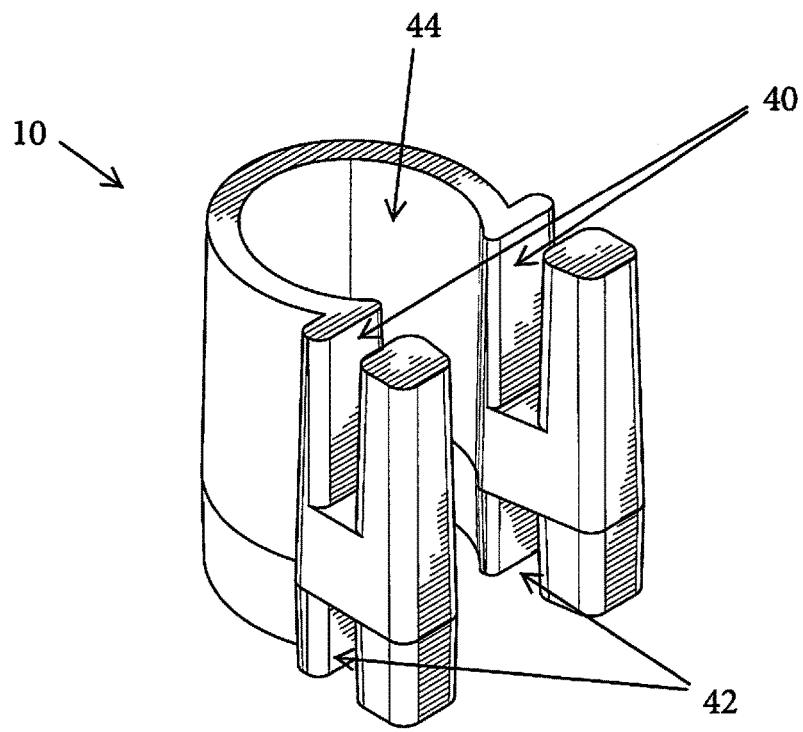
FIG. 26 is a perspective view of a clip of the apparatus of the present invention.
Figure 27:
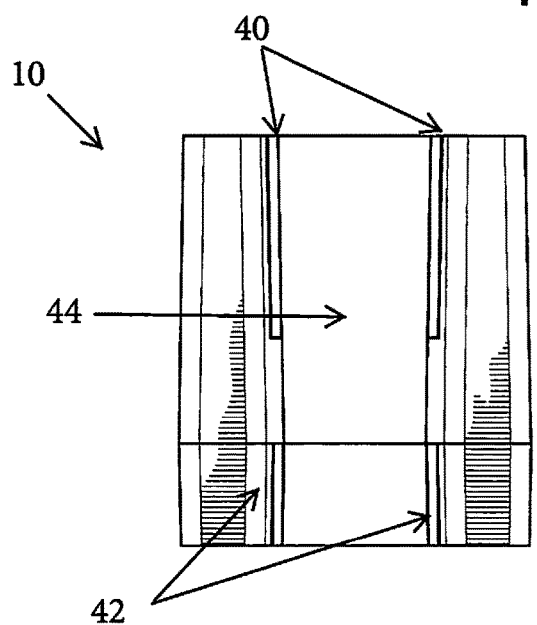
FIG. 27 is a plan view of an outside, or non-pot-facing side, of the clip of the apparatus of the present invention.
Figure 28:
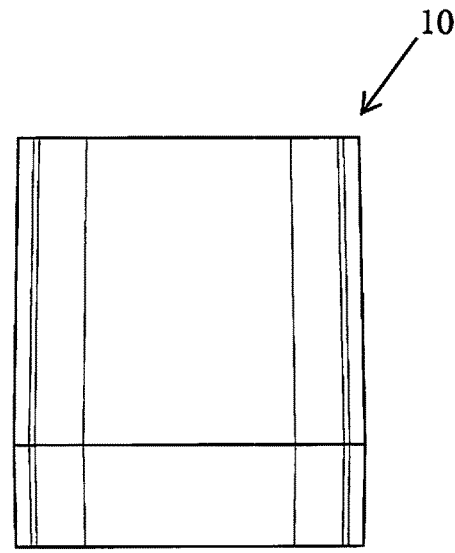
FIG. 28 is a plan view of an inside, or pot-facing side, of the clip of the apparatus of the present invention.
Figure 29:
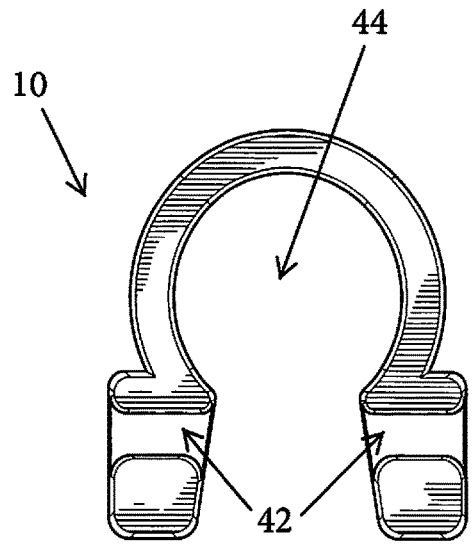
FIG. 29 is a plan view of a bottom side of the clip of the apparatus of the present invention.
Figure 30:
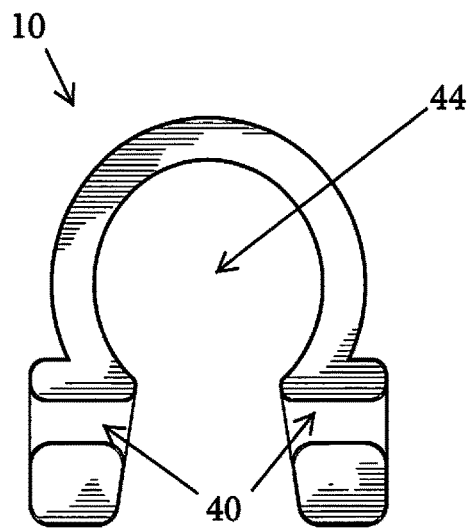
FIG. 30 is a plan view of a top side of the clip of the apparatus of the present invention.
Figures 31, 32:
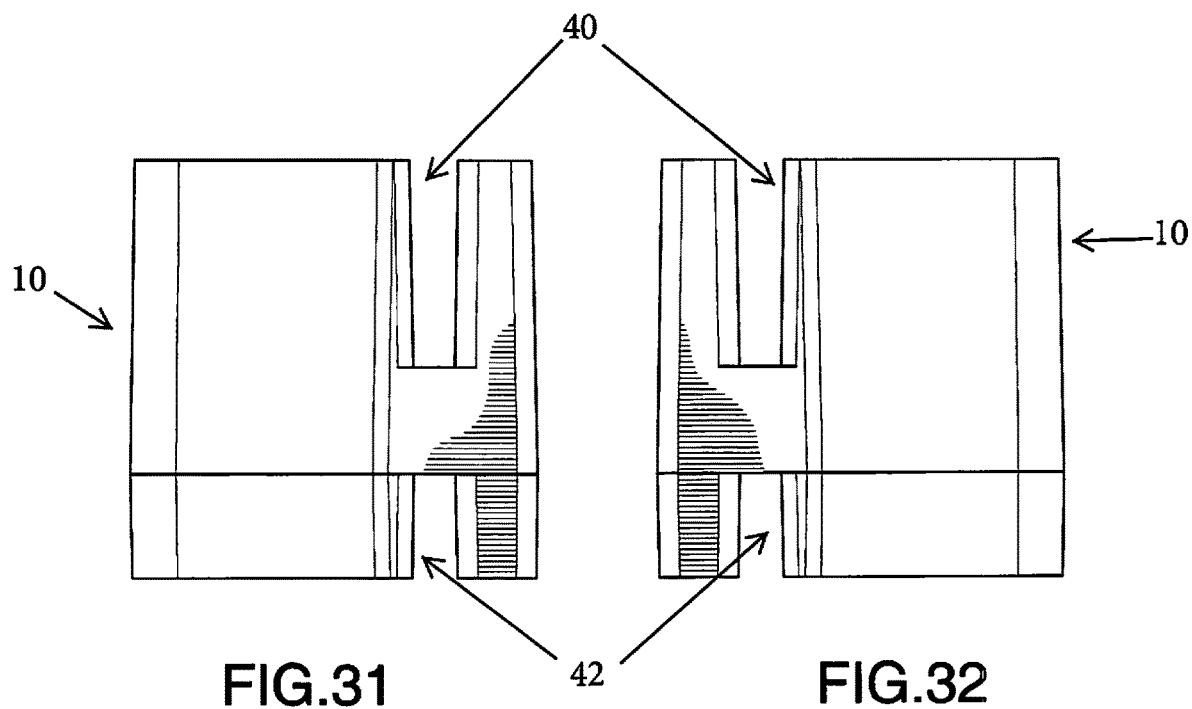
FIG. 31 is a plan view of a left side of the clip of the apparatus of the present invention.
FIG. 32 is a plan view of a right side of the clip of the apparatus of the present invention.

As shown in FIG. 4 and FIG. 12-18 the lower stand 6 comprises a collar 28 having interlocking collar teeth 30, a foot 24 integral with the collar 28, and a stake lower through-hole 26 integral with the foot 24. When the apparatus 2 is removably engaged upon a pot 48, the foot 24 is in contact with and underneath a bottom of the pot 48 to secure the lower stand 6 upon the pot 48. With reference to FIG. 17, a collar angle 54 of the collar 28 to the foot 24 is from about 90° to about 95°, but preferably the collar angle 54 is 94° which is optimal.

As shown in FIG. 4 and FIG. 18-25 the lock 8 comprises a neck opening 32 to removably receive the neck 20 of the upper stand 4, a collar opening 36 to removably engage the collar 28 of the lower stand 6, and a stake lock through-hole 34. The lock 8 further comprises a collar rim 38 that abuts a top of the collar 28 and retains the lock 8 in place upon the apparatus 2 when the upper stand 4 and lower stand 6 are removably engaged with each other.

As shown in FIGS. 1-3 and FIGS. 26-32 the clip 10 further comprises at least an upper notch 40 and at least a lower notch 42 to engage removably with a trellis 46. The clip 10 further comprises a clip stake receiver recess 44 to removably engage with a stake 12.

Figure 2:
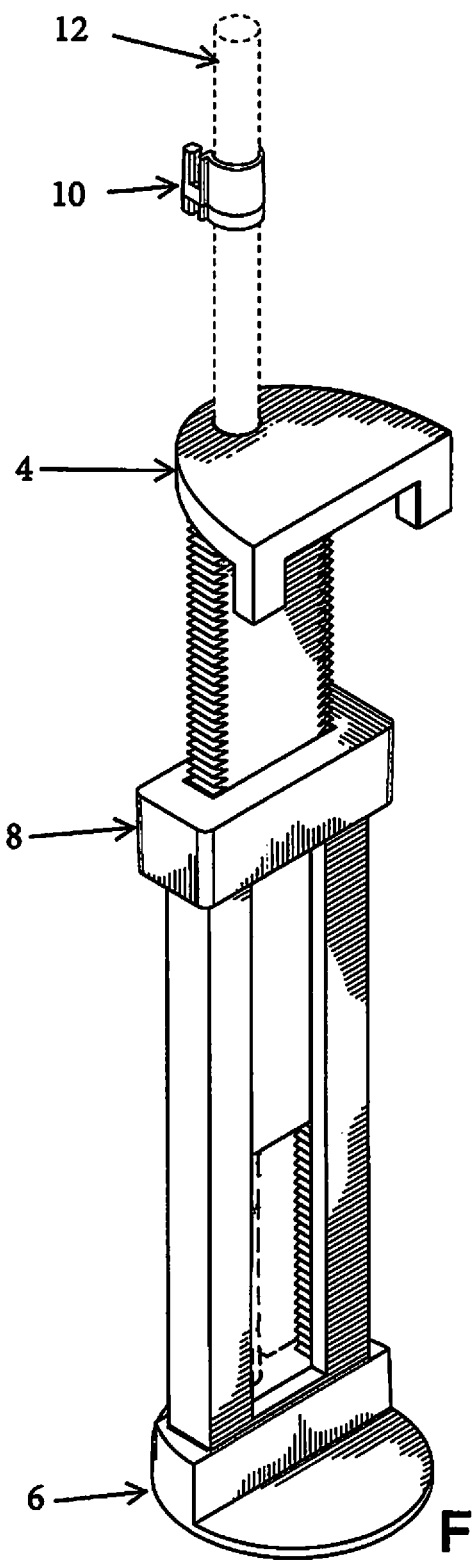
FIG. 2 is a perspective view of an inside, or pot-facing side, of an assembled apparatus of the present invention.
Figure 3:
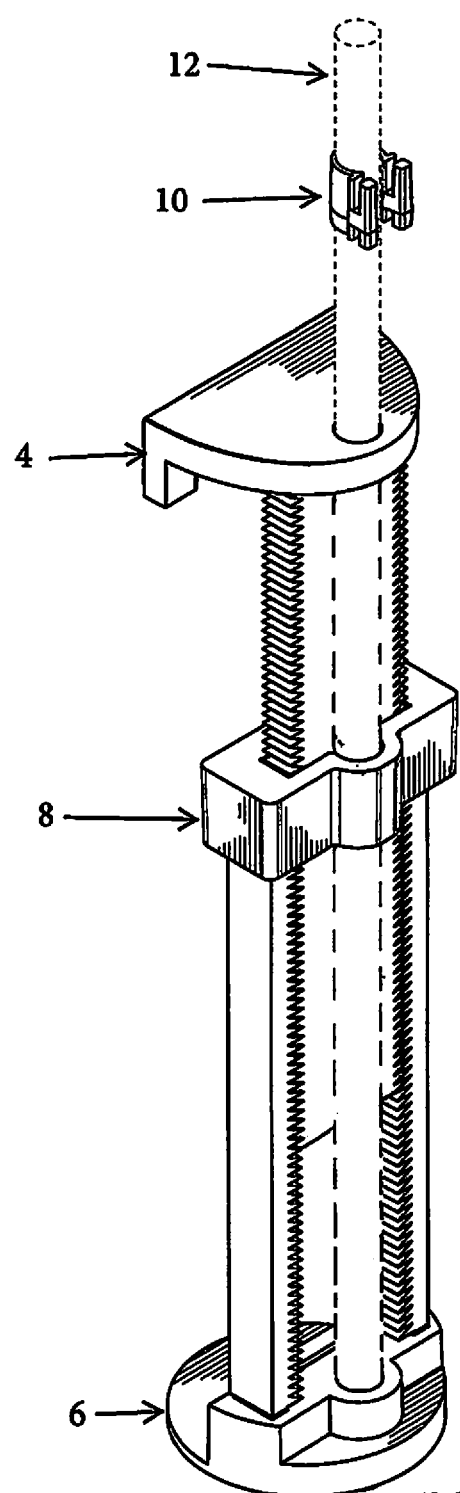
FIG. 3 is a perspective view of an outside, or non-pot-facing side, of an assembled apparatus of the present invention.
Figure 4:
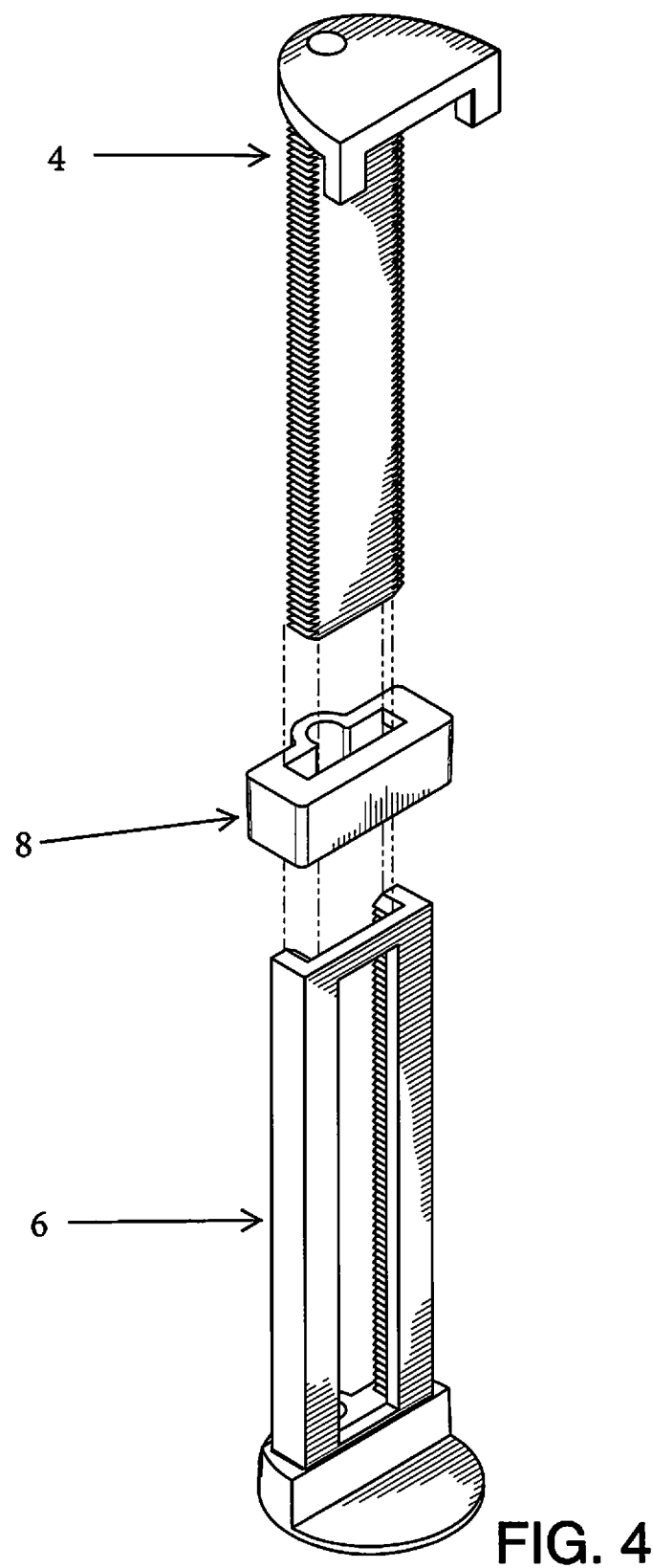
FIG. 4 is an exploded view of an inside of an unassembled apparatus of the present invention.
Figure 5:
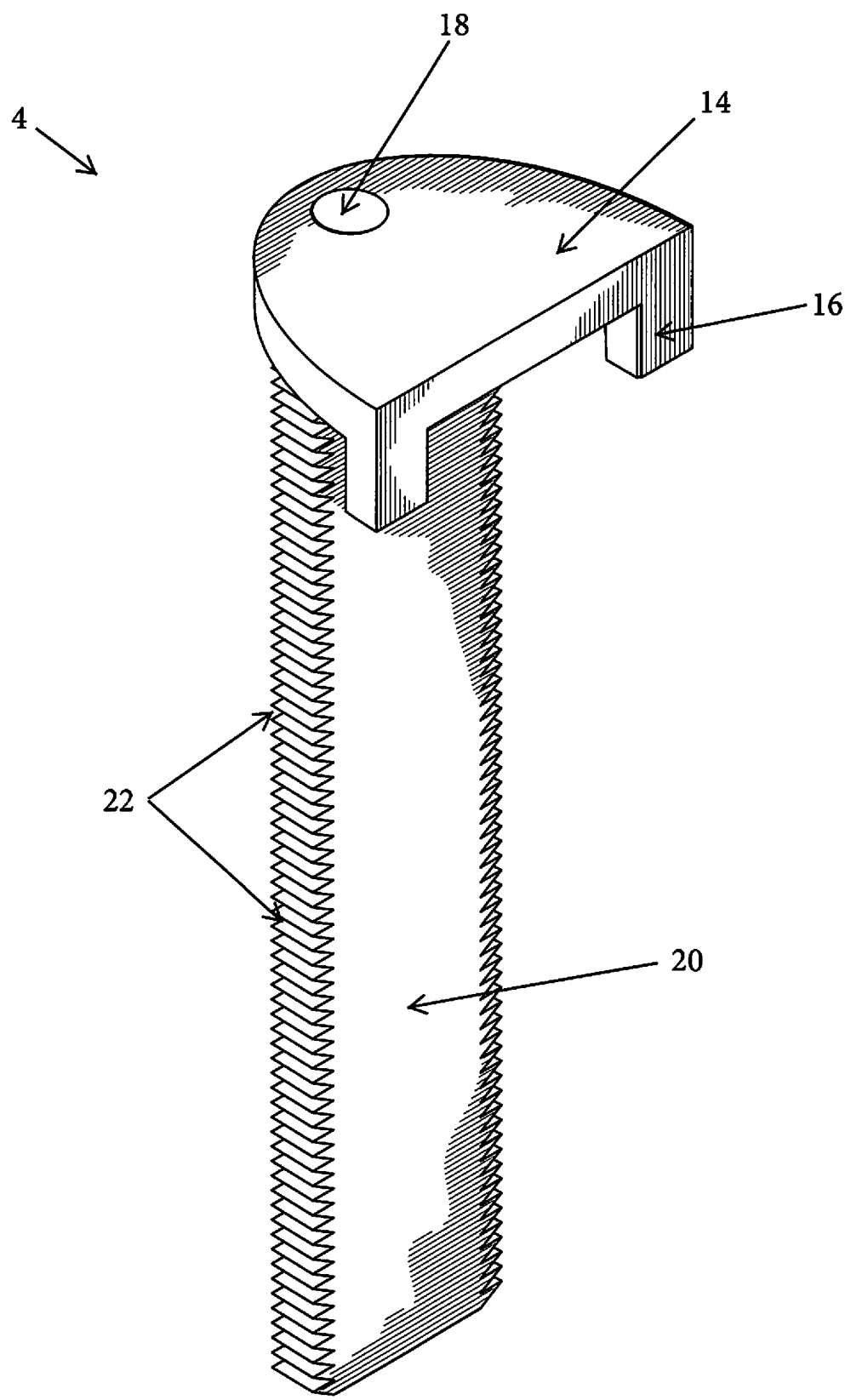
FIG. 5 is a perspective view of an inside of an upper portion of a pot stand of the apparatus of the present invention.
Figure 6:
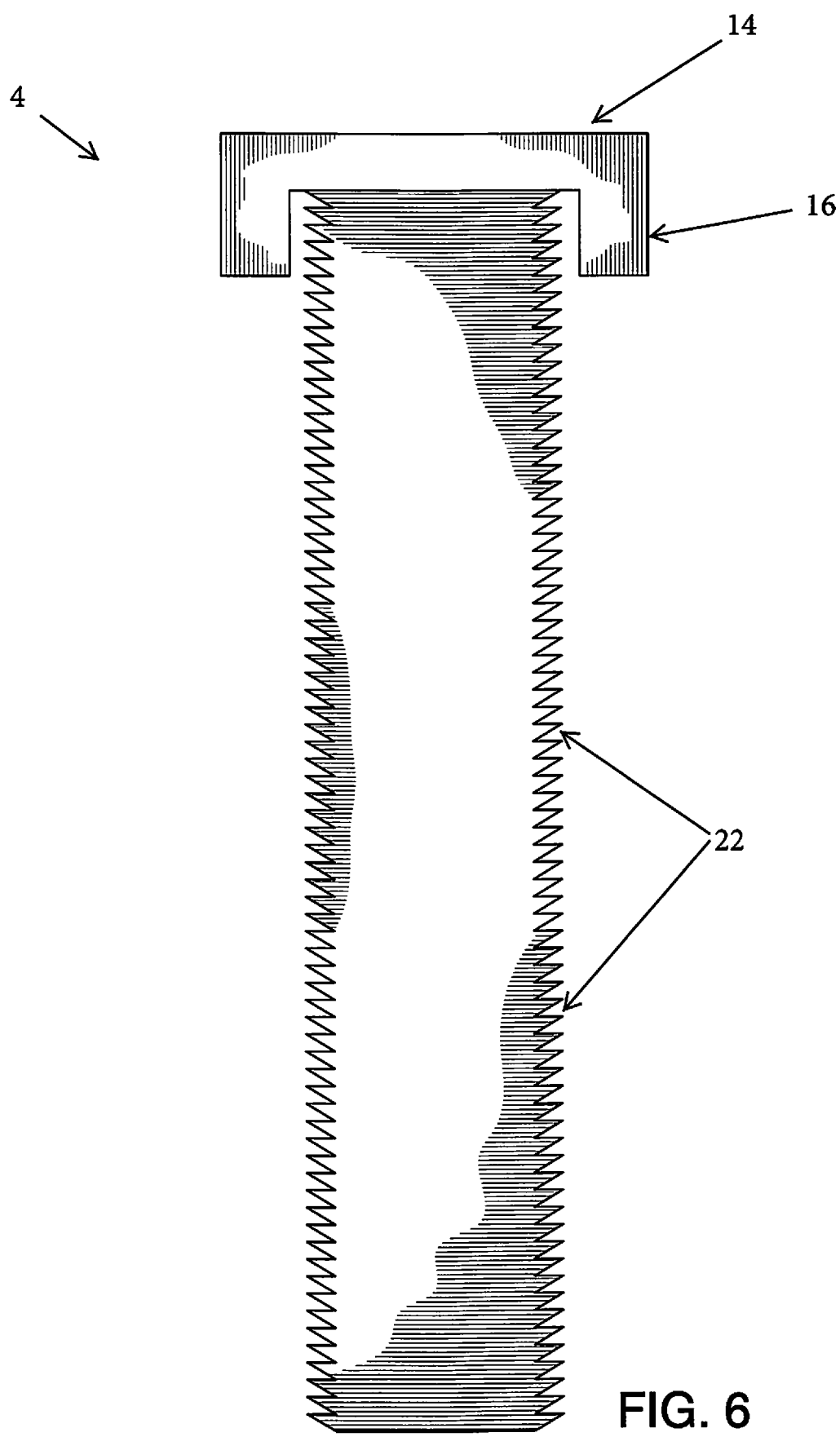
FIG. 6 is a plan view of an inside of the upper portion of the pot stand of the apparatus of the present invention.

With reference to FIGS. 2-4, to assemble the apparatus 2 of the present invention, the neck 20 of the upper stand 4 is slid through the neck opening 32 of the lock 8 with the stake upper recess 50 aligned with the stake lock through-hole 34. Next, the neck teeth 22 are then removably engaged or interlocked with the collar teeth 30 of the lower stand 6 such that a desired height of the apparatus 2 is obtained to engage removably with and to accommodate a height of the pot 48 upon which the apparatus 2 is installed. Next, the lock 8 is slid downward along the neck 20 to removably engage with the collar 28 such that the collar rim 38 abuts the top of the collar 28, thus locking the upper stand 4 and lower stand 6 together, and in turn, securing the assembled apparatus 2 upon the pot 48.

In like manner and with reference to FIG. 1, to assemble the apparatus 2 of the present invention on a pot 48, the foot 24 of the lower stand is placed underneath the pot 48 and the collar 28 against an outer perimeter of the pot 48, then the neck 20 of the upper stand 4 is slide through the neck opening 32 of the lock 8 with the stake upper recess 50 aligned with the stake lock through-hole 34. Next, the neck teeth 22 are then removably engaged or interlocked with the collar teeth 30 of the lower stand 6 such that the cap 14 rests upon a rim of the pot 48 and the lip 16 is over the rim of the pot 48 and against an inner perimeter of the pot 48, so as to obtain a desired height of the apparatus 2 which is removably engaged with and accommodates a height of the pot 48 upon which the apparatus 2 is installed. Next, the lock 8 is slid downward along the neck 20 to removably engage with the collar 28 such that the collar rim 38 abuts the top of the collar 28, thus locking the upper stand 4 and lower stand 6 together, and in turn, securing the assembled apparatus 2 upon the pot 48.

With reference to FIGS. 1, 3, 5, 7-9, 12, 15-17, 22 and 23, after the apparatus 2 stands 4, 6 are removably engaged with each other and installed upon the pot 48, a stake 12 is inserted into a stake upper through-hole 18, passed along a stake upper recess 50, passed through a stake lock through-hole 34 and inserted into a stake lower through-hole 26 to secure the stake 12 within the apparatus 2. As alternative embodiments, the stake lower through-hole 26 on a bottom side of the foot 24 may be either open, allowing the stake 12 to pass completely through the foot 24, or closed, preventing the stake completely through the foot completely through the foot 24 from passing completely through the foot 24.

With reference to FIGS. 1-3, and FIG. 26-32, to attach an optional trellis 46 to the apparatus 2, at least a clip 10 is attached to each stake 12. The clip 10 may be attached to a stake 12 by means of a clip stake receiver recess 44 and, preferably, with an upper notch 40 of the clip 10 facing upward from a rim and toward an exterior of the pot 48. The clip 10 either may be slid along a length of the stake 12 to a desired position, or may be snapped in place (by means of tension) along a length of the stake 12 at a desired position. Next, a trellis 46 is attached to the clip 10 by either hanging or suspending a portion of the trellis 46 within the upper notch 40 of the clip 10, or wrapping or lassoing a portion of the trellis 46 around both at least an upper notch 40 and at least a lower notch 42 of the clip 10 to secure the trellis in place upon the apparatus 2 of the present invention.

With reference to FIG. 1, preferably, three or four apparatuses 2 of the present invention are installed equidistant about the exterior perimeter of and upon a pot 48. Although not shown, to further secure the apparatus 2 upon a pot 48, an optional, adjustable belt or strap can be wrapped around and cinched snug about an outer perimeter of both of the apparatus 2 and the pot 48. The belt or strap, while optional, ensures the apparatus 2 stays on the pot 48, even while a user is moving the pot 48 around.

The apparatus 2 of the present invention with the upper stand 4 and lower stand 6 assembled and installed upon a container 48 is from about 9.5" to about 17.0" in height and is able to accommodate a standard 5-gallon size or a larger size container 48. A standard 5-gallon size container 48 is about 12" in diameter or about 38" in circumference about the rim and is about 10" in height. Also, the apparatus 2 of the present invention can accommodate a standard container-gardening stake 12 that is about 12 mm or about 0.47" in diameter and from about 3' to about 6' in height. Further, the apparatus 2 of the present invention can accommodate a standard trellis 46 (made of light-weight wire, string, plastic netting or the like) of about 5' in height by about 8' in circumference and which can encircle and enclose a plant with the container 48.

In other embodiments of the apparatus 2 of the present invention, the cap 14 and the neck 20 of the upper stand 4 can be manufactured as separate parts that are assembled together post production, as opposed to being manufactured as a unitary component. Likewise, the foot 24 and the collar 28 of the lower stand 6 can be manufactured as separate parts that are assembled together post production, as opposed to being manufactured as a unitary component. Producing the cap 14, neck 20, foot 24 and collar 28 of the apparatus 2 as separate components that are then assembled post production lends greater ease and efficiency to creation of molds for, manufacturing of and packaging of the apparatus 2.

With such a produced, disassembled upper stand 4, the neck 20 either may snap into an underside of the cap 14 or may slide into an opening in and down from a topside of the cap 14 and snap or mate into place with the cap 14 to form an integral upper stand 4. In the former configuration of the assembled lower stand 6, when the apparatus is assembled and attached upon a pot 48, the pressure or contact of the pot 48 on the cap 14 will prevent the cap 14 from coming apart from the neck 20.

Likewise, with such a produced, disassembled lower stand 6, the collar 28 either may snap into a topside of the foot 24 or may slide into an opening in and up from an underside of the foot 24 and snap or mate into place with the foot 24 to form an integral lower stand 6. In the later configuration of the assembled lower stand 6, when the apparatus is assembled and attached upon a pot 48, the pressure or contact of the pot 48 on the foot 6 will prevent the foot 24 from coming apart from the collar 28.

The upper stand 4, lower stand 6, lock 8 and clip 10 of the apparatus 2 of the present invention may be manufactured with any suitable, durable and sufficiently strong material, such as plastic, wood, metal or the like. A preferred material is plastic and a preferred manufacturing process is injection molding for cost efficiency and production expediency purposes.

Unless defined otherwise, all technical and scientific terms used herein have the same meaning as commonly understood by one of ordinary skill in the art to which this invention belongs. Any methods and materials similar or equivalent to those described herein can also be used in the practice or testing of the present invention; however, the preferred methods and materials are now described. Although the present invention has been described with reference to specific embodiments, it is understood that modifications and variations of the present invention are possible without departing from the scope of the invention, which is defined by the claims set forth below.

The invention claimed is:

1. A potted plant support apparatus comprising:
   an upper stand with interlocking teeth; and
   a lower stand with interlocking teeth;
   wherein the upper stand and the lower stand removably engage with each other by means of the interlocking teeth; and
   further wherein the engaged apparatus is mounted on an exterior of a container.

2. The apparatus of claim 1 further comprising a lock to secure the engaged upper stand and the lower stand to each other.

3. The apparatus of claim 2, wherein the lock further comprises a neck opening able to receive removably the neck of the upper stand; a collar opening able to engage removably the collar of the lower stand; and
   a stake lock through-hole able to accommodate a stake.

4. The apparatus of claim 3, wherein the lock further comprises a collar rim that abuts a top of the collar and retains the lock in place upon the apparatus when the upper stand and lower stand are engaged removably with each other.

5. The apparatus of the claim 1 further wherein the engaged apparatus can accommodate a stake.

6. The apparatus of claim 5 further comprising a clip able to be attached removably to a stake.

7. The apparatus of claim 6, wherein the clip further comprises at least an upper notch and at least a lower notch able to engage removably with a trellis; and a clip stake receiver recess able to engage removably with a stake.

8. The apparatus of claim 3 further comprising a trellis able to be attached removably to the clip.

9. The apparatus of claim 1, wherein the upper stand further comprises a neck having interlocking neck teeth and an upper stake recess along a length of the neck; a cap integral with the neck and the cap having a stake upper through-hole; and a lip integral with the cap.

10. The apparatus of claim 9, wherein a neck angle of the neck to the cap is about 90°.

11. The apparatus of claim 1, wherein the lower stand further comprises a collar having interlocking collar teeth; and a foot integral with the collar and the foot having a stake lower through-hole.

12. The apparatus of claim 11, wherein a collar angle of the collar to the foot is from about 90° to about 95°.

13. The apparatus of claim 12, wherein the collar angle of the collar to the foot is about 94°.

14. The apparatus of claim 1 further comprising an adjustable strap to secure the apparatus upon the container, wherein the strap can be wrapped around and cinched snug about an outer perimeter of both the apparatus and the container.

15. A potted plant support apparatus comprising:
an upper stand with interlocking teeth;
a lower stand with interlocking teeth; and
a lock to secure the engaged upper stand and the lower stand to each other;
wherein the upper stand and the lower stand removably engage with each other by means of the interlocking teeth;
wherein the engaged apparatus can accommodate a stake; and
further wherein the engaged apparatus is mounted on an exterior of a container.

16. The apparatus of claim 15 further comprising a clip able to be removably attached to a stake and having at least an upper notch and at least a lower notch able to engage removably with a trellis; and a clip stake receiver recess able to engage removably with the stake.

17. The apparatus of claim 16 further comprising a trellis able to be attached removably to the clip.

18. The apparatus of claim 15, wherein the upper stand further comprises a neck having interlocking neck teeth and an upper stake recess along a length of the neck; a cap integral with the neck and the cap having a stake upper through-hole; a lip integral with the cap; and further wherein a neck angle of the neck to the cap is about 90°.

19. The apparatus of claim 15, wherein the lower stand further comprises a collar having interlocking collar teeth; a foot integral with the collar and the foot having a stake lower through-hole; and further wherein a collar angle of the collar to the foot is about 94°.

20. The apparatus of claim 15, wherein the lock further comprises a neck opening able to receive removably the neck of the upper stand; a collar opening able to engage removably the collar of the lower stand; a stake lock through-hole to accommodate a stake; and a collar rim that abuts a top of the collar and retains the lock in place upon the apparatus when the upper stand and lower stand are engaged removably with each other.

21. The apparatus of claim 15 further comprising an adjustable strap to secure the apparatus upon the container, wherein the strap can be wrapped around and cinched snug about an outer perimeter of both the apparatus and the container.

22. A potted plant support apparatus comprising:
an upper stand with a neck having interlocking neck teeth and an upper stake recess along a length of the neck; a cap integral with the neck and the cap having a stake upper through-hole; a lip integral with the cap; and a neck angle of the neck to the cap is about 90°;
a lower stand with a collar having interlocking collar teeth; a foot integral with the collar and the foot having a stake lower through-hole; and
a collar angle of the collar to the foot is about 94°;
a lock to secure the engaged upper stand and lower stand to each other and having a neck opening able to receive removably the neck of the upper stand; a collar opening able to engage removably the collar of the lower stand; a stake lock through-hole to accommodate a stake; and a collar rim that abuts a top of the collar and retains the lock in place upon the apparatus when the upper stand and lower stand are engaged removably with each other; and
a clip able to be attached removably to a stake and the clip having at least an upper notch and at least a lower notch able to engage removably with a trellis; and a clip stake receiver recess able to engage removably with a stake;
wherein the upper stand and the lower stand removably engage with each other by means of the interlocking teeth;
wherein the engaged apparatus can accommodate a stake; and
further wherein the engaged apparatus is mounted on an exterior of a container.

23. The apparatus of the claim 22 further wherein the engaged apparatus is able to accommodate a stake.

24. The apparatus of claim 22 further comprising a trellis able to be attached removably to the clip.

25. The apparatus of claim 22 further comprising an adjustable strap to secure the apparatus upon the container, wherein the strap is able to be wrapped around and cinched snug about an outer perimeter of both the apparatus and the container.

* * * * *